[84.]

I. P. Tice. Pulverizing Roller Plow.

No. 118,758. Patented Sep. 5, 1871.

Witnesses:
Edw. F. Brown
W. F. Henderson

Inventor:
Isaac P. Tice

UNITED STATES PATENT OFFICE.

ISAAC P. TICE, OF NEW YORK, N. Y.

IMPROVEMENT IN PLOWS.

Specification forming part of Letters Patent No. 118,758, dated September 5, 1871; antedated August 21, 1871.

*To all whom it may concern:*

Be it known that I, ISAAC P. TICE, of the city, county, and State of New York, have invented a new and Improved Rotary or Pulverizing-Plow, which is also applicable to grading or dredging purposes; and I do hereby declare that the following is a full, clear, and exact description of the same, reference being had to the accompanying drawing making a part of this specification.

This invention relates to a new and improved rotary plow or pulverizer, the same being also applicable for the purposes of grading and dredging. The invention consists in the employment or use of a collar provided circumferentially with a series of concentric flanges placed at a suitable and equal distance apart, and arranged as hereinafter described. The invention consists, further, in the employment or use of a series of scrapers or combs arranged in connection with the roller and operating in conjunction therewith, as hereinafter set forth.

Figure 1:
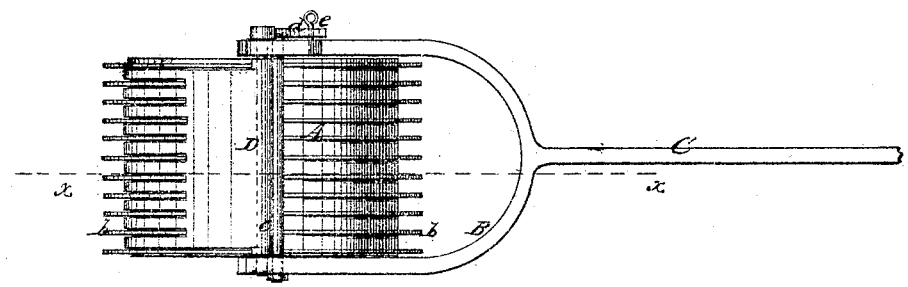
Figure 2:
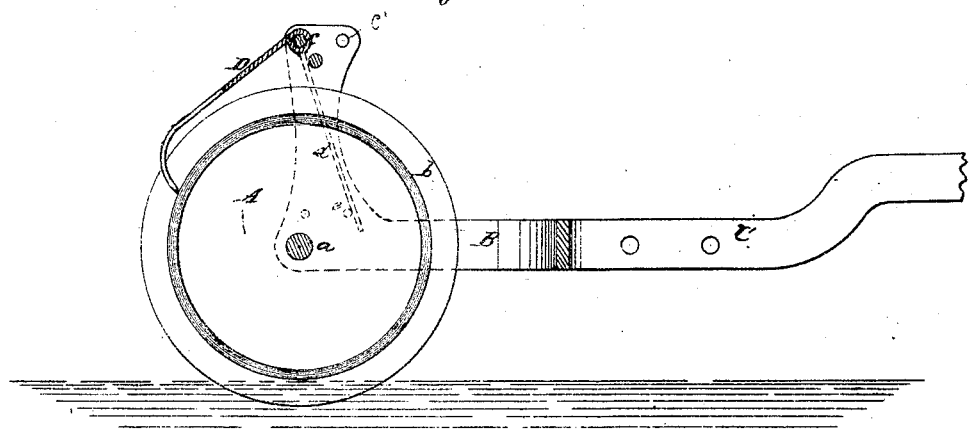

In the accompanying drawing, Figure 1 is a plan or top view of my invention; Fig. 2, a side sectional view of the same taken in the line $x\,x$, Fig. 1.

Similar letters of reference indicate corresponding parts in the two figures.

A represents a roller which has its bearings in a frame, B, provided with a draft-pole, C. The frame B is of divicated or forked form, the ends of the forward portion extending upward at right angles, as shown clearly in Fig. 2. The bearings $a$ of the roller A are at the angles of the bent ends of the frame B, as shown in Fig. 2. The flanges $b$ on the roller A are placed at an equal and suitable distance apart, and the scrapers or combs are formed on a plate, D, which is hung on an axis, $c$ or $c'$, having a spring, $d$, extending down one end of it, said spring bearing against a pin, $e$, or other fixture, and having a tendency to keep the scrapers or combs in the interstices between the flanges $b$. (See more particularly Fig. 2.) In the upright portion of the ends of the frame B there are made extra holes to receive the ends of the axis $c$ of the scrapers or combs, to admit of the latter being adjusted higher or lower, as may be required.

The operation of the machine will be very readily understood. The implement may be drawn along by a team or otherwise, and the flanges $b$ of the roller sink into the earth, the interstices between the flanges filling up with the soil, which is lifted and raised as the roller rotates, until it reaches the point where the scrapers or combs bear against the roller. At this point the soil is, of course, scraped off or out from the interstices between the flanges, and the soil falls in a pulverized state at the rear of the roller.

From the above description it will be seen that the device may be used for grading and dredging purposes, as it will lift the earth and carry it to any point, whence it may be conveyed in carts to any desired locality, by simply detaching the scrapers or combs. It may also be used as an ordinary roller, as the interstices between the flanges fill up with the earth, forming a smooth and even or true surface.

What I claim as new, and desire to secure by Letters Patent, is—

1. A series of parallel disks, $b$, having a distance of from three to twelve inches from each other and projecting from the face of the roller about the same distance, more or less, according to the nature of the soil and the work to be done, as and for the purpose specified.

2. The scrapers D, when made to fit the spaces between the flanges $b$ and held in contact with the face of the roller by a spring, $d$, or equivalent, as specified.

3. The adjustability of the scraper D from $c$ to $c'$, as and for the purpose specified.

ISAAC P. TICE.

Witnesses:
 EDM. F. BROWN,
 W. G. HENDERSON.